June 24, 1952     C. A. HEILAND ET AL     2,601,522

METHOD FOR GEOPHYSICAL EXPLORATION

Filed Feb. 28, 1946

INVENTORS:
Carl A. Heiland and
BY    Matthew T. Murray

Attorneys

Patented June 24, 1952

2,601,522

UNITED STATES PATENT OFFICE 2,601,522

METHOD FOR GEOPHYSICAL EXPLORATION

Carl A. Heiland, Denver, and Matthew T. Murray, Lakewood, Colo.

Application February 28, 1946, Serial No. 650,816

4 Claims. (Cl. 181—.5)

This invention relates to improvements in methods of and apparatus for geophysical exploration and its primary purpose is to increase the effectiveness of the seismic energy used in mapping subsurface geologic formations by the reflection and refraction of elastic waves.

In seismic-geophysical refraction or reflection surveying the depths of the upper surfaces or strata of geologic formations are determined by measuring the time intervals elapsed between the generation and reception of elastic impulses which are artificially created. In the earlier stages of seismic prospecting, it was customary to explode comparatively large charges of dynamite at the earth's surface to produce sufficient energy to actuate the seismic detectors. With the advent of reflection technique it became necessary to bury dynamite charges at depths ranging from several tens to several hundreds of feet in order to produce energy sufficient to be reflected from deep layers and to actuate receiving mechanisms at the surface. It was also found that indiscriminate deep burial of charges was not sufficient but that it was in many cases necessary to plant the charges below the so-called "weathered layer."

All of the foregoing measures of the prior art were made necessary, primarily, by the fact that the energy from an explosive charge radiates in all directions, that is, not only toward the target and the receivers but also, and very largely, away from them. Only a very small fraction of the energy of the discharge reaches the receivers in the form of refractions or reflections, thus making it necessary either to employ large charges at the surface or to bury the charges below the surface and in a medium having favorable transmission characteristics, that is, in a medium below the weathered layer. A further disadvantage of this prior practice has been that the cost of labor and equipment necessary for a proper placement of the charges is very substantial. For each seismic reflection prospecting party, there are required at least one rotary shothole drill, a driller, an assistant driller, a truck to carry water for drilling, a shooting truck equipped with water for tamping the shotholes after planting the charges, and equipment for pulling the shothole casings. In difficult shooting areas, it has often been necessary to employ more than one prospecting party or to employ additional drills so that the drilling operations can be carried on ahead of the shooting and recording party.

The present invention involves the discovery that the difficulty and expense of seismic exploration may be greatly reduced, and the effectiveness of the operations greatly increased, by the use of charges which permit the "beaming" of the seismic energy to the desired points. By this method the practice of shot-drilling can be substantially reduced or entirely eliminated, since the energy of the charge is more effectively and efficiently utilized in actuating the recording apparatus. This result is attained by employing charge units or cartridges which are specially constructed to utilize the "hollow charge" principle, commonly known as the Munroe effect. According to this principle, the explosive charge is formed as a hollow unit with a cavity, preferably of cone shape, on the side thereof from which it is desired to direct the energy of the discharge, with the result that the main force of the discharge, instead of spreading out in all directions, is concentrated in the cavity or hollow chamber and results in a concentrated stream or beam of terrific energy which may be directed in a known direction, so that it may be made effective, either by reflection or refraction in operating recording apparatus.

One object of the invention is to construct a specially formed charge unit or cartridge which will obtain the foregoing results when used and one which may be employed in shallow auger holes or used, in successive units, at progressively increasing crater depths, with or without confinement. Another object is to provide a charge unit or cartridge which may be planted in the proper orientation with respect to the vertical so that the maximum-energy discharge path will have the desired relationship to the critical refraction or reflecting angles of the geologic formations under investigation. Other objects of the invention relate to various features of the method of exploration and the apparatus used in the practice of that method, all of which will appear more fully hereinafter.

The nature of the invention will be understood from the following specification taken with the accompanying drawings in which one form of the new seismic exploration charge unit and several examples of the improved method of employing that unit are illustrated. In the drawings, Figure 1 shows a vertical section through the preferred form of the directional charge unit of the present invention;

Figure 1:
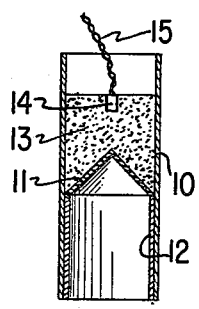
Figure 2:
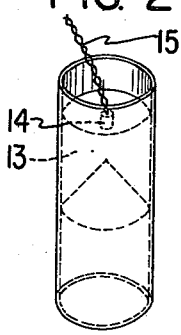
Fig. 2 is a somewhat diagrammatic perspective view of the charge unit illustrated in Fig. 1, showing the internal construction by dotted lines.

As shown in Figs. 1 and 2, the charge unit or cartridge is preferably made up of a cylindrical tube 10, formed preferably of pasteboard or the like, having mounted therein an inverted metal cone 11 supported along its lower edge by a cylinder 12 formed preferably of pasteboard or the like which may be secured by adhesive or other suitable means to the tube or cylinder 10. The charge 13 of dynamite or other explosive forms a compact unit in the tube or cylinder 10 above the inverted cone 11 and its top surface terminates preferably below the upper end of the tube 10. An electric blasting cap 14 having supply conductors 15 is embedded in the upper surface of the dynamite charge 13 immediately before firing. With this arrangement, it will be seen that the charge 13 is hollow on its under side and that this hollow chamber is continued within the cylinder 12 which extends downwardly to the lower margin of the surrounding tube or cylinder 10. For best results, it is found that the distance from the lower edge of the inverted cone 11 to the bottoms of the cylinders 10 and 12 may preferably be substantially equal to the internal diameter of the tube 10. Instead of being formed of pasteboard or the like, the tubes 10 and 12 may be formed of plastic or other non-metallic material.

Figure 3:
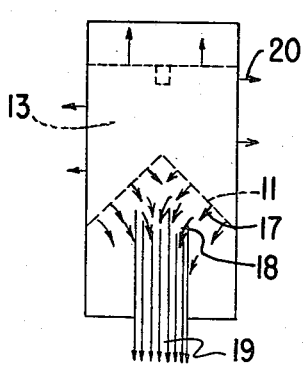
Fig. 3 is a diagrammatic vertical section through the improved charge unit showing the formation of a directed beam or stream of energy as a result of the explosion of the charge.

In Fig. 3, there are illustrated diagrammatically the results which follow the explosion of the dynamite charge 13. As a result of the explosion of this charge, the energy of the explosion is directed inwardly, transversely to the surfaces of the cone 11, as indicated by the arrows 17, and this energy then passes downwardly, as indicated by the arrows 18, resulting in the formation of a stream or beam of energy 19 directed axially of the tube 10. Other portions of the energy of the discharge may be directed outwardly in all other directions to some extent, as indicated by the arrows 20, but it is found that, due to the Munroe effect referred to above, the major portion of the energy of the discharge is concentrated in the beam 19 which thus makes it possible to direct this energy at a desired angle so that the major portion of it may be utilized either by refraction or reflection to actuate recording apparatus.

Figure 4:
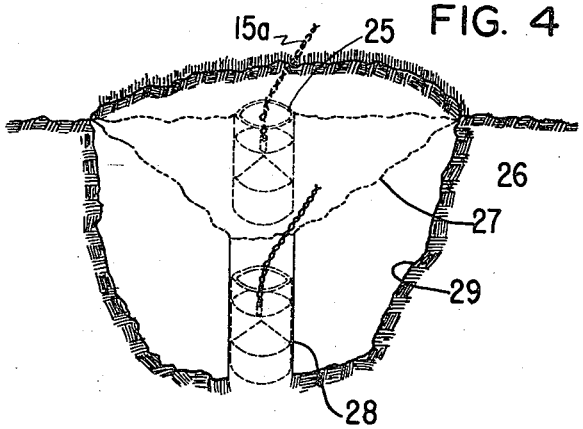
Fig. 4 illustrates one method of planting the improved charge unit at or near the surface and of planting successive charge units at progressively increasing depths as successive charges are exploded.

Due to the fact that terrific energy is concentrated in a single beam from the exploration charge unit, it is possible to obtain desirable results by exploding the charge near the surface of the geologic formation under investigation. The method of using the discharge unit or cartridge in this manner is illustrated somewhat diagrammatically in Fig. 4 where a charge unit 25, shown by dotted lines, has initially been embedded in the earth 26 with its upper end substantially at the earth's surface. The result of igniting and exploding the charge of the unit 25 through electrical energy supplied through the conductors 15a is the formation of a crater, the lower margin of which is indicated by the dotted lines 27. After such a crater has been formed by the discharge of one unit or cartridge, a second unit or cartridge 28 may be placed in a cavity extending downwardly from the bottom of the crater 27 and, when the explosive contained in the unit 28 is discharged, there will be formed a second crater illustrated by the full lines 29. The holes in which the charges 25 and 28 are placed may be formed conveniently by hand by the use of a post-hole digger or auger. The upper end of the initial charge 25 may be placed at or below the earth's surface or it may be placed at a greater depth and covered with earth. In either event, it will be found that an effective discharge beam or stream of energy is created which passes downwardly in alignment with the axis of the explosive unit and that the energy expended in other directions will be comparatively small and that the craters 27 and 29 created by the explosion of the charges are comparatively small in transverse area in comparison with those created by explosive charges of the types heretofore used where explosive energy has been expended with substantial uniformity in all diretcions. By this method, therefore, it is possible to obtain results which are comparable with or superior to those obtained by embedding charges of the old type at greater depths and in formations having more favorable transmission characteristics.

As is well known to those skilled in the art, the refraction technique of seismic prospecting is applied mainly to the exploration of comparatively shallow formations and utilizes that part of the seismic energy which, coming from the shot point, is refracted by a formation having higher velocity characteristics so that it travels in this formation in an essentially horizontal direction and is then refracted out of that formation in a symmetrical manner so that it again reaches the surface and operates the vibration detectors which are located there. In the use of reflection technique in seismic exploration, on the other hand, there is utilized mainly that part of the energy of the discharge which is reflected from deep subsurface formations. With either type of exploration, the propagation of the energy of the discharge is essentially controlled by the contrast between the velocity characteristics of the earth surrounding the shock point and those of the refracting and the reflecting formations.

Figure 5:
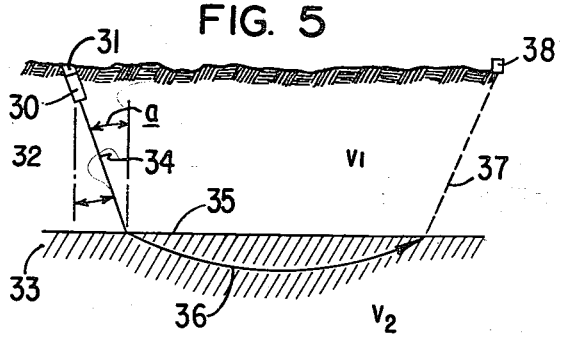
Fig. 5 shows the method of implanting the charge and aiming it at the proper angle for directing the energy beam at the desired critical angle in refraction shooting.

The use of the improved discharge unit or cartridge of the present invention in refraction exploration is illustrated somewhat diagrammatically in Fig. 5 which shows a vertical section through the earth with a charge unit 30 placed in an auger hole 31 at or near the surface of the earth layer 32 which lies above the stratum 33, the depth of which is under investigation. There is a critical angle $a$, shown in Fig. 5, at which the energy issuing from the charge unit 30 along the path 34 must strike the intersurface 35 between the two formations 32 and 33 with the respective velocities $v1$ and $v2$, in these formations, to be refracted into the nearly horizontal ray 36 which will emerge from the stratum 33, in substantially symmetrical fashion, so that the energy of the discharge will then pass along the line 37 to the detecting or recording apparatus 38 located at the surface. By this means, relatively small charges properly located at or near the surface may be utilized for refraction prospecting with a large part of the energy of the discharge being eventually received by the recording apparatus.

Figure 6:
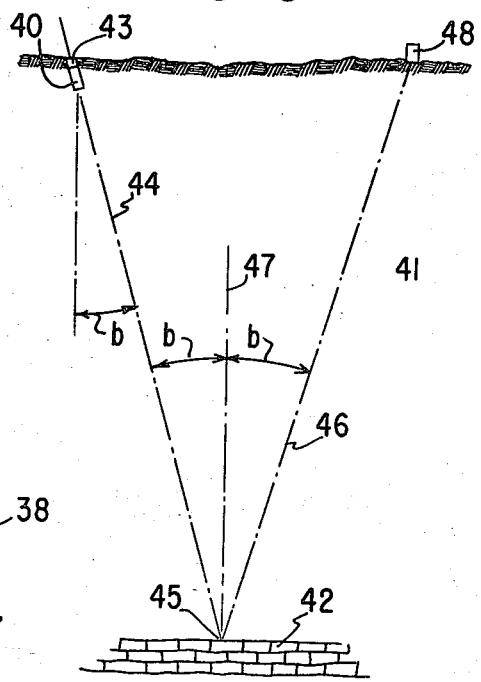
Fig. 6 shows the method of implanting the charge and aiming the beam of the discharge at the required angle for reflection mapping.

The use of the method of the present invention in reflection prospecting is illustrated in Fig. 6 where a vertical section through a portion of the earth illustrates the practice of placing a charge unit or cartridge 40 in a relatively shallow hole at the surface of the formation 41 which lies above the stratum or formation 42, the depth of which is being studied. The charge unit or cartridge 40 is located in the hole 43 at the surface with its axis at that favorable angle $b$ to the vertical at which the maximum energy is transmitted along the line 44. The energy beam 44 is reflected from the surface of the formation 42 at the point 45 and passes upwardly again along the line 46, the two lines 44 and 46 making substantially the same angle $b$ with the vertical line 47. The energy transmitted along the line 46 is received by indicating or recording apparatus 48 located at the surface. In practice, the spacing between the shot points or holes 43 and the detectors or indicators 48 may be so chosen as to obtain the best response.

Although one form of the improved charge unit and practice and methods of using it according to the present invention have been set forth by way of illustration, it will be understood that the charge unit or apparatus may be constructed in various forms and that the method of seismic exploration of the present invention may be practiced in various ways without departing from the scope of the appended claims.

We claim:

1. The method of seismic prospecting which comprises the steps of forming an explosive charge unit capable of discharging the major portion of its explosive energy as a beam, positioning said charge in the earth to direct said beam at an angle substantially equal to that of the critical refraction ray of an underlying earth formation, exploding said charge unit, and recording the resulting vibrations at a point removed from the place where said unit is exploded.

2. The method of seismic prospecting which comprises the steps of forming an explosive charge unit capable of discharging the major portion of its explosive energy as a beam, positioning said charge in the earth to direct said beam at an angle substantially equal to that of the critical refraction ray of an underlying earth formation, exploding said charge unit, and recording the resultant vibrations at the surface at a point removed from the place of discharge.

3. The method of seismic prospecting which comprises the steps of forming a shot hole in the earth extending downwardly at an angle to the horizontal substantially equal to that of the critical refraction ray of an underlying earth formation, positioning in said shot hole an explosive charge unit shaped to discharge the major portion of its explosive energy downwardly in the direction of the axis of said shot hole, exploding said charge unit, and recording the resulting vibrations at the surface at a point removed from the place of discharge.

4. The method of seismic prospecting which comprises the steps of embedding in the earth an explosive charge unit having in its lower end a cavity directed at an angle to the horizontal substantially equal to the critical refraction ray of an underlying earth formation, exploding said charge unit, and recording the resulting refracted vibrations at a point removed from the place of exploding said charge unit.

CARL A. HEILAND.
MATTHEW T. MURRAY.

REFERENCES CITED

The following references are of record in the file of this patent:

UNITED STATES PATENTS

| Number | Name | Date |
|---|---|---|
| 1,724,720 | McCollum | Aug. 13, 1929 |
| 2,317,415 | Smith | Apr. 27, 1943 |
| 2,340,314 | Farnham | Feb. 1, 1944 |
| 2,384,851 | Reichert | Sept. 18, 1945 |
| 2,399,211 | Davis et al. | Apr. 30, 1946 |
| 2,407,093 | Mohaupt | Sept. 3, 1946 |
| 2,413,680 | Blackinton et al. | Jan. 7, 1947 |
| 2,419,414 | Mohaupt | Apr. 22, 1947 |

FOREIGN PATENTS

| Number | Country | Date |
|---|---|---|
| 28,030 | Great Britain | 1911 |
| 81,732 | Switzerland | July 1, 1919 |
| 113,685 | Australia | Aug. 1941 |
| 367,858 | Great Britain | Feb. 26, 1932 |